United States Patent [19]

Kimura et al.

[11] Patent Number: 5,254,826
[45] Date of Patent: Oct. 19, 1993

[54] CONTACT DETECTING DEVICE FOR POSITIONING RELATIVELY MOVABLE ELEMENTS

[75] Inventors: Munenori Kimura; Takuji Magara, both of Aichi, Japan

[73] Assignee: Mitsubishi Denki K.K., Tokyo, Japan

[21] Appl. No.: 618,446

[22] Filed: Nov. 27, 1990

[30] Foreign Application Priority Data

Mar. 28, 1990 [JP] Japan .................................. 2-79509

[51] Int. Cl.$^5$ .............................................. B23H 1/02
[52] U.S. Cl. ............................ 219/69.13; 219/69.12; 219/69.16; 219/69.9; 324/559
[58] Field of Search ............... 219/69.12, 69.13, 69.16, 219/69.18, 69.17, 69.19; 324/122, 558, 559

[56] References Cited

U.S. PATENT DOCUMENTS

| | | | |
|---|---|---|---|
| 3,609,281 | 9/1971 | Kauffman | 219/69.19 |
| 4,347,425 | 8/1982 | Obara | 219/69.13 |
| 4,614,854 | 9/1986 | Obara et al. | 219/69.13 |
| 4,654,497 | 3/1987 | Obara | 219/69.12 |
| 4,678,884 | 7/1987 | Obara et al. | 219/69.18 |
| 4,820,895 | 4/1989 | Obara | 219/69.13 |
| 4,827,213 | 5/1989 | Spaude | 219/69.16 |
| 4,833,289 | 5/1989 | Obara | 219/69.13 |
| 4,862,095 | 8/1989 | Yamamoto et al. | 219/69.12 |

FOREIGN PATENT DOCUMENTS

| | | | |
|---|---|---|---|
| 57-201134 | 12/1982 | Japan | 219/69.17 |
| 59-152021 | 8/1984 | Japan | 219/69.12 |
| 29246 | 2/1985 | Japan . | |
| 61-50714 | 3/1986 | Japan | 219/69.13 |
| 2-48117 | 2/1990 | Japan | 219/69.12 |
| 3-196916 | 8/1991 | Japan | 219/69.13 |

*Primary Examiner*—Geoffrey S. Evans
*Attorney, Agent, or Firm*—Sughrue, Mion, Zinn, Macpeak & Seas

[57] ABSTRACT

A device for positioning a first and second conductive elements and, in particular, detecting contact at a gap therebetween without causing damage to either element. A pulse voltage, having a low duty, is applied to the gap. The occurrence of a contact is identified by a voltage drop at the gap, which is detected by comparing the gap voltage to a reference. A control circuit, comprising a flip-flop or one-shot operative in synchronism with the source of pulse voltage, generates a contact identification signal in response to the detection of a voltage drop at the gap.

22 Claims, 6 Drawing Sheets

ACTUAL GAP STATE

GAP VOLTAGE

COMPARATOR OUTPUT

REFERENCE OSCILLATION SIGNAL

INVERTED REFERENCE

FLIP-FLOP OUTPUT

JUDGEMENT OF CONTACT DETECTING DEVICE

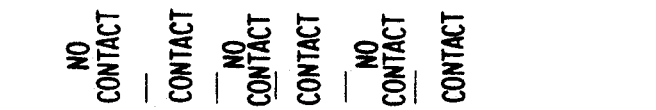
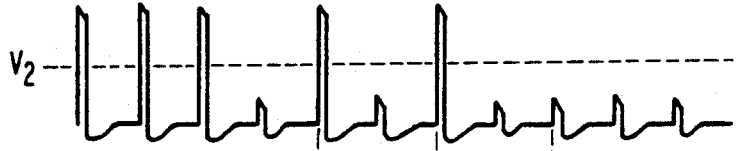
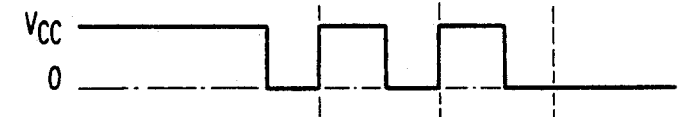
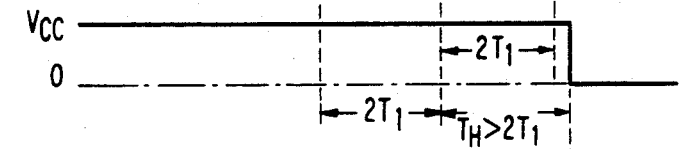
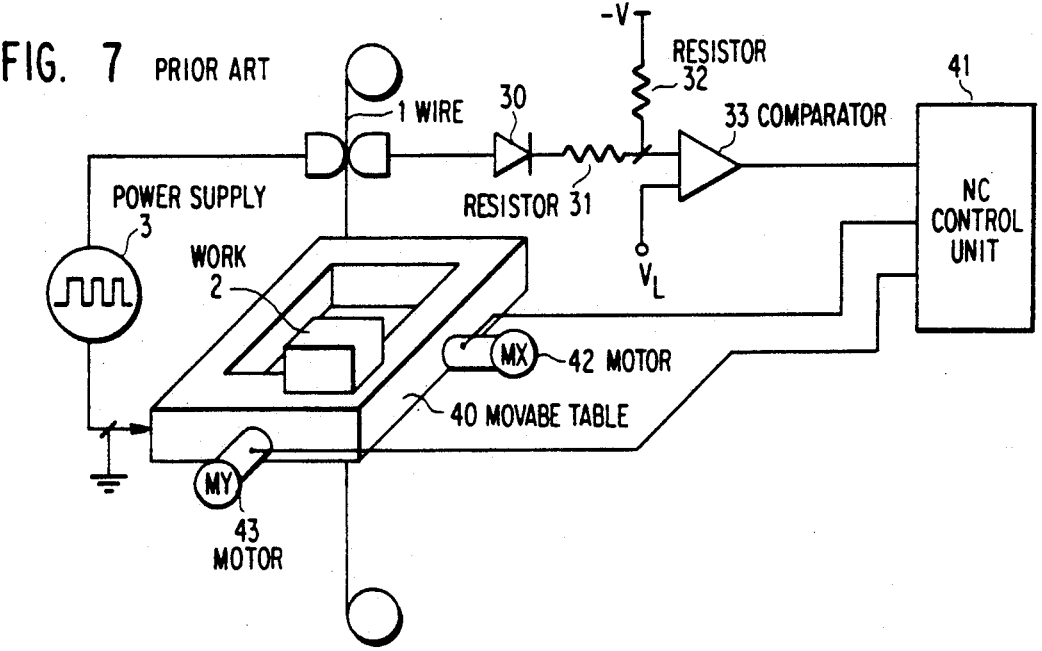

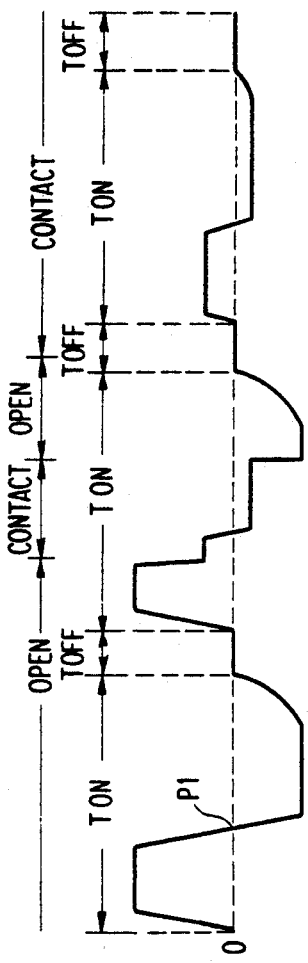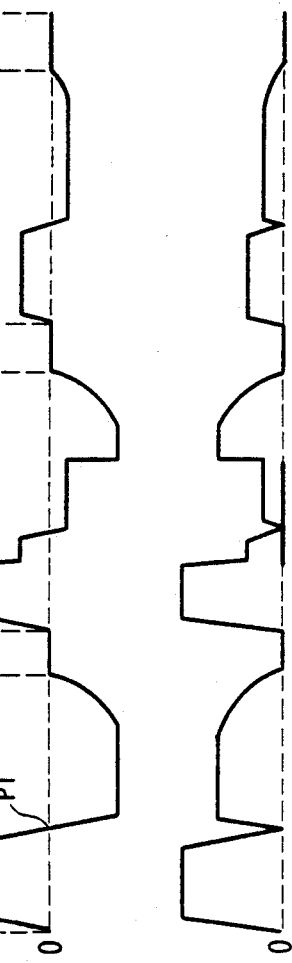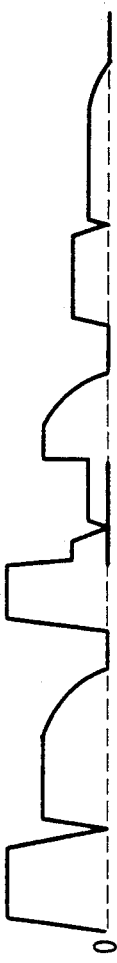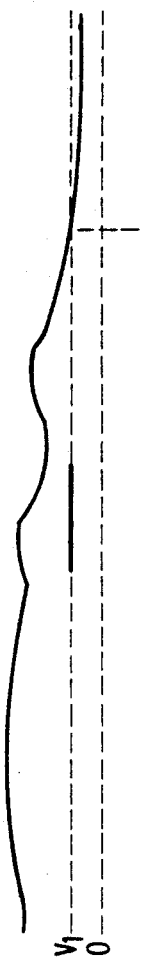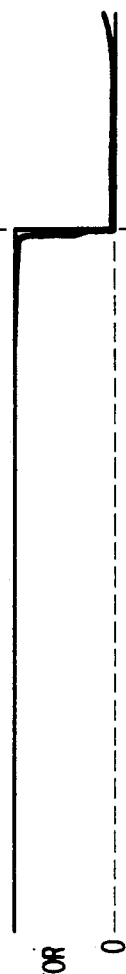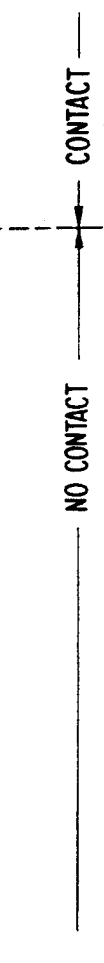
FIG. 9A  PRIOR ART  GAP STATE
FIG. 9B  PRIOR ART  GAP VOLTAGE
FIG. 9C  PRIOR ART  AFTER PASSING THE ABSOLUTE VALUE CIRCUIT
FIG. 9D  PRIOR ART  AFTER PASSING THE $V_1$ FILTER CIRCUIT
FIG. 9E  PRIOR ART  OUTPUT VOLTAGE OF THE COMPARATOR
FIG. 9F  PRIOR ART  JUDGEMENT OF THE CONTACT DETECTING DEVICE

CONTACT DETECTING DEVICE FOR POSITIONING RELATIVELY MOVABLE ELEMENTS

FIELD OF THE INVENTION

The present invention relates generally to a device for positioning two relatively movable elements by means of detecting contact therebetween. The invention finds specific application in the positioning of a tool electrode with respect to a workpiece, for use with a machine tool such as an electric discharge machining system (hereinafter referred to as an "EDM"). In particular, the invention as exemplified in the embodiments herein described concerns a contact detecting device for judging the relative position of a wire electrode and a workpiece on the basis of a predetermined reference contact point. The tool electrode and the workpiece are moved relative to each other to bring a reference surface of the workpiece and a surface of the tool electrode into contact with each other to establish the reference contact point.

DESCRIPTION OF THE PRIOR ART

Generally, in an EDM for cutting a workpiece with electrical discharge generated between an electrode and the workpiece, the cutting proceeds by changing the relative positions of the electrode and the workpiece in accordance with the commands of a numerical control ("NC") unit. The relative positions of the electrode and the workpiece must be precisely maintained in order to provide high cutting accuracy. To satisfy such a requirement, contact detecting devices for use with an EDM have been developed. Such devices have a contact position determining function that detects a point of contact between the electrode and the workpiece to subsequently determine the relative positions thereof. This device requires that the electrode and the workpiece be moved into direct contact with each other.

A prior art contact detecting device applied to a wirecut EDM for cutting a workpiece (hereinafter referred to as the "work") with a wire electrode (hereinafter referred to as the "wire") is illustrated in FIG. 7, where wire 1 is provided with cutting power from power supply 3. A work 2 is positioned with respect to the wire by a movable table 40, operated by orthogonal positioning motors 42 (x-direction) and 43 (y-direction) under control of a numerical controller 41. The wire 1 is connected by a first electrode to the cutting power supply 3 and receives a discharge current in order to effect a cut. The wire 1 also is connected by a second electrode to a diode 30, located in series with resistors 31 and 32, followed by a comparator 33.

In the prior art device shown in FIG. 7, the work 2 is EDMed by applying a pulsed voltage of approximately $-100$ V, for example, to the wire 1 from the cutting power supply 3. During this EDMing operation, the voltage applied to the wire 1 is blocked by the diode 30 which keeps the comparator 33 from receiving the voltage. In positioning the wire 1 and the work 2, a low d.c. voltage $-V$ (e.g., $-5$ V to $-15$ V) is applied to wire 1 via the resistors 31, 32, the diode 30 and the second electrode. This low voltage may be applied during movement of the wire 1 and the work 2 relative to each other and into contact with each other. Contact of the wire 1 and the work 2 changes the input to the comparator 33. If this change is compared with a reference voltage $V_L$, the result of the comparison can be used to detect the contact of the wire 1 and the work 2, to thereby judge the relative positions of the wire 1 and the work 2.

In the prior art device, however, corrosion may occur at a contact surface of the work 2 when the wire 1 and the work 2 are brought into contact with each other and a low voltage is applied. Since the wire 1 and the work 2 are contacted with each other several times in order to judge their relative position, a significant amount of corrosion will be generated on the contact surface of the work 2. This corrosion will reduce the accuracy of the measurement and reduce repeatability. If there is corrosion, the change in voltage input to the comparator 33 as a result of a contact will be delayed because the layer of oxide built up by the corrosion will act as an insulator. As a result of the delay, the work 2 will be in contact with the wire 1 for a period longer than desired, and contact will not be detected until after it has occurred, leading to inaccuracy in the contact position detection.

This problem is particularly acute when water is used as a dielectric. In a wirecut EDM employing water as the EDMing dielectric, if positioning is effected in the water or with water drops on the wire 1 and/or the work 2, corrosion rapidly occurs on the contact surface(s). If this corrosion causes the wire 1 to rest for an extended period against the wire 2, due to the delay in detecting a voltage change, the contact surface(s) will be damaged by electrolysis and the water will become ionized. Also, as the corrosion increases and/or electrolysis occurs and the delay is changed, there is a further reduction in repeatability.

A device for resolving the disadvantages of the prior art system is shown in FIG. 8, which illustrates a device disclosed in Japanese Kokai 1985-29246. This publication generally describes a wirecut EDM equipped with a contact detecting device for applying a voltage across a gap between the wire 1 and the work 2 (hereinafter referred to as the "gap") and detecting the contact of the wire 1 and the work 2 in accordance with the voltage variations at the gap. A moving table 40 mounts the work 2 and is movable in X-axis and Y-axis directions. An NC control unit 41 connects to motors 42, 43 for moving the table 40 in accordance with commands from the NC control unit 41. A contact detecting device 4 is operative to judge whether or not the wire 1 and the work 2 are making contact with each other and to send a corresponding signal to the NC control unit 41. The work 2 and the moving table 40 are electrically connected to each other.

The contact detecting device 4 applies a bipolar pulse voltage to the gap for purposes of contact detection. The bipolar voltage acts to reduce the occurrence of discharge traces, corrosion, electrolysis, etc., thereby improving the detection accuracy of contact. The bipolar pulse voltage to be detected is produced by circuit 5 including a transistor 50, whose gate is connected to a reference oscillation signal 51 for switching the transistor 50 on/off. As transistor 50 is operated, a voltage $V+$ from a source connected to a collector of transistor 50 is switched across the primary coil of pulse transformer 53. A diode 52 is connected across the primary coil of the pulse transformer 53 and a current limiting resistor 54 is connected across the secondary coil of the transformer. A switch 55 selectively connects the secondary coil to ground. A contact detecting circuit 44 determines if contact has been made at the gap in accordance with the level of the gap voltage and provides a corresponding signal to the NC unit 41. The contact detecting circuit 44 comprises an absolute value circuit (ABS) 45 for full wave-rectifying the gap voltage, a filter circuit 46 for smoothing the full wave-rectified voltage, and a comparator 47 for comparing the full wave-rectified and filtered gap voltage with a reference voltage $V_1$ and transmitting a corresponding signal to the NC unit (41).

The contact position determining operation conducted by means of the contact detecting device of the prior art can be understood with reference to FIGS. 9A-9F, which illustrate the contact judging operation of the contact detecting device 4 using voltage waveforms from within the circuit in FIG. 8.

Referring to FIG. 8, when a command to request the contact position determining operation is transmitted to the NC control unit 41, the switch 55 is closed and the bipolar pulse voltage is applied to the gap by the bipolar pulse voltage generating circuit 5. The approaching speeds and approaching directions of the wire 1 and the work 2 are determined and the wire 1 and the work 2 move toward each other. At this time, the gap voltage is full-wave rectified and smoothed by the contact judging circuit 44. The comparator 47 is operative to compare the detected voltage with the predetermined reference voltage $V_1$ and judge whether or not the wire 1 and the work 2 are making contact with each other. The full-wave rectified and smoothed gap voltage becomes smaller than the reference voltage $V_1$, as the wire 1 and the work 2 approach and touch each other. When this occurs, a signal indicating the occurrence of contact is sent to the NC control unit 41 by the contact judging circuit 44. The control unit causes the relative wire and work movement at the gap to stop, and the contact position determining operation is complete.

FIG. 9A shows the "open" and "contact" state of the wire 1 and work 2 over a period of time. The gap voltage, as seen in FIG. 9B, will vary between a positive peak and a negative peak during the contact position determining operation with a crossing point at P1, so long as the transistor 50 is conducting, during period $T_{on}$. When the transistor 50 is not conducting during period $T_{off}$, the gap voltage is zero. As seen by a comparison of FIGS. 9A and 9B, the magnitude of the gap voltage during $T_{on}$ is reduced as contact is made between the wire 1 and work 2, since the work is electrically connected to the table 40, which is at a lower voltage as seen in FIG. 8. The gap voltage changes as the wire 1 and work 2 are brought in and out of contact, and as the transistor 50 is switched ON and OFF.

As seen in FIGS. 9C and 9D, respectively, the gap voltage is rectified by the absolute value circuit 45 and smoothed by circuit 46 before being applied to the comparator 47.

As seen from FIG. 9E, the comparator will provide an output only when the filtered gap voltage is less than the reference voltage $V_1$. Once this transition occurs, the contact detecting device judges that the wire 1 and work 2 are in contact, as seen in FIG. 9F.

However, as compared to actual gap changes, the judgment of the contact detecting device 44 as to whether or not the wire 1 and the work 2 are making contact with each other includes a delay, due to the absolute value circuit 45 and the filter circuit 46. In particular, an extremely large time constant must be set for the filter circuit 46 in order to avoid misjudging non-contact as contact during the time when the pulse voltage is not applied ($T_{off}$) and the time when the pulse voltage polarity is switched (P1). As a result, it is impossible to accurately and reliably judge subtle changes of the gap state, and it is inevitable that the wire will contact the work for some time before contact is detected, with the consequent disadvantages.

In order to decrease the time constants of the absolute value circuit 45 and filter circuit 46, for purposes of reducing the delay in contact determination, it is necessary to shorten the period $T_{off}$ of the pulse voltage 51 and to reduce the peak to peak voltage thereof. But in such case, the duty of the detection pulse is high, the positive and negative sides of the bipolar pulse are nearly symmetrical, and a large current will flow due to electrolysis in water when the wire 1 and work 2 are adjacent to or in contact with each other. As a result, the wire 1 and work 2 will be damaged, resulting in poor positioning repeatability and unreliable contact detection.

A highly similar prior art circuit is shown in U.S. Pat. No. 4,654,497 to Obara. An extended discussion of this reference is not necessary because of its similarity to the FIG. 8 circuit and its concurrent disadvantages.

SUMMARY OF THE INVENTION

It is, accordingly, an object of the present invention to overcome the disadvantages of the prior art by providing a contact position determining device which will minimize damage to the elements to be contacted.

It is another object of the present invention to provide a contact position determining device that will ensure high detection sensitivity.

It is a further object of the present invention to provide a contact position determining device that will enable precision positioning at the time of contact position determination.

The foregoing objects are accomplished in the present invention by providing a contact detecting device that repeatedly applies an asymmetrical bipolar pulse voltage to a gap between a tool electrode and a workpiece and detects contact of the tool electrode and the workpiece in accordance with a change in the asymmetrical bipolar pulse voltage, the voltage being provided by a low-duty, asymmetrical bipolar pulse voltage generating current.

The above objects also are achieved by providing a contact detecting device, further comprising a contact judging circuit for detecting the high-peak level of an asymmetrical bipolar pulse voltage applied to the gap in synchronization with a cycle of the asymmetrical bipolar pulse voltage and for judging whether or not the tool electrode and the workpiece are making contact with each other.

BRIEF DESCRIPTION OF THE DRAWINGS

FIGS. 6A–6F are operation diagrams and waveforms for an embodiment of the present invention.

FIG. 7 is a circuit diagram of a contact detecting device known in the prior art.

FIGS. 9A–9F are operation diagrams and waveforms for the prior art circuit shown in FIG. 8.

DESCRIPTION OF THE PREFERRED EMBODIMENT

Figure 1:
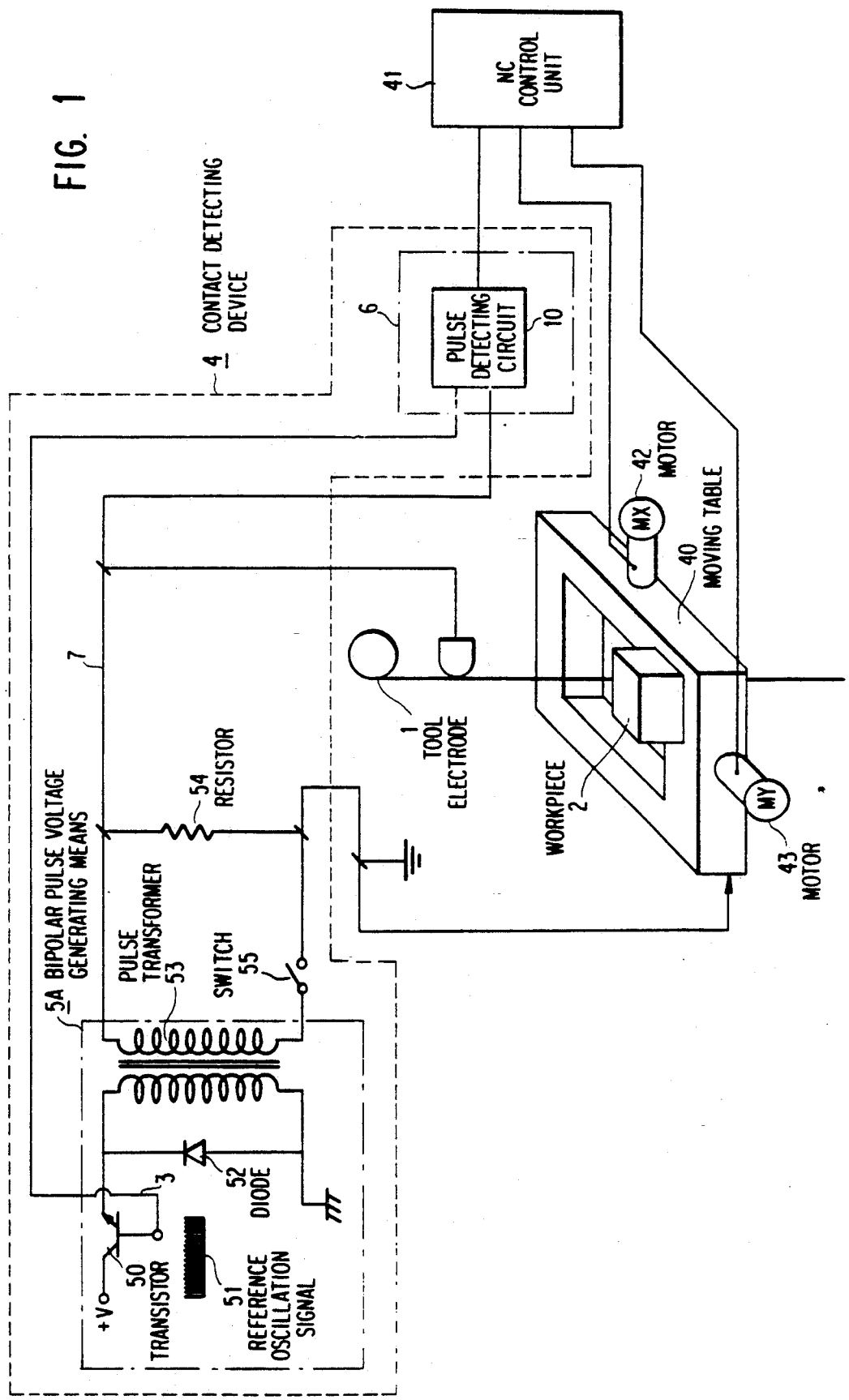
FIG. 1 is a circuit diagram of a contact detecting device for use with a wirecut EDM according to one embodiment of the present invention.
Figure 8:
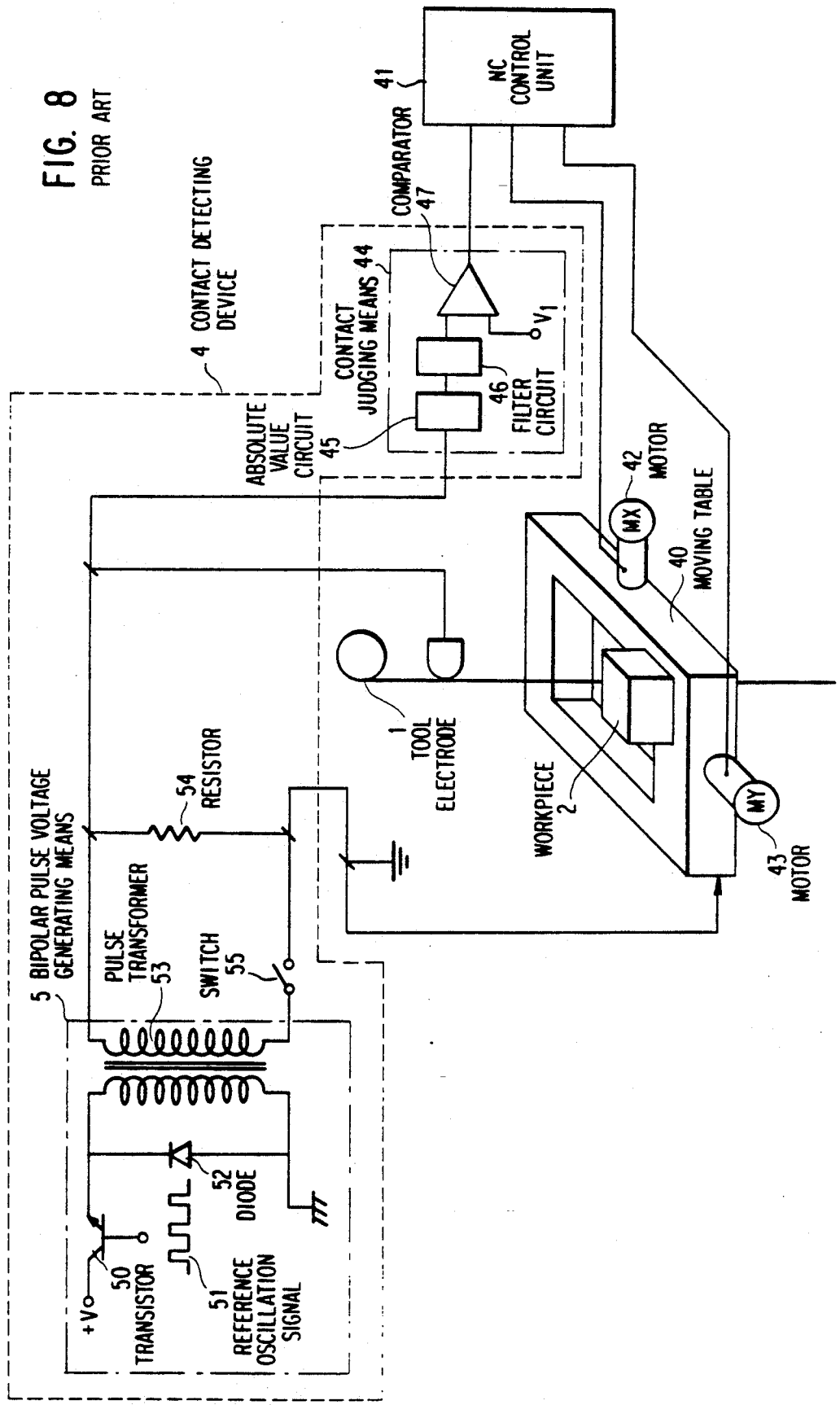
FIG. 8 is a circuit diagram of another prior art contact detecting device which solves some disadvantages of the prior art shown in FIG. 7.

FIG. 1 illustrates one embodiment of the present invention and provides a general view of a wirecut EDM equipped with a wire-work contact detecting device. In FIG. 1, like numerals indicate like or corresponding parts in FIG. 8. FIG. 1 includes a faulty pulse detecting circuit 10, which detects the high-peak level of an asymmetrical bipolar pulse voltage applied to the gap, in synchronization with the cycle of the asymmetrical bipolar pulse voltage, judges whether the wire 1 and the work 2 are making contact with each other, and transmits a corresponding signal to the NC control unit (41).

Figure 2:
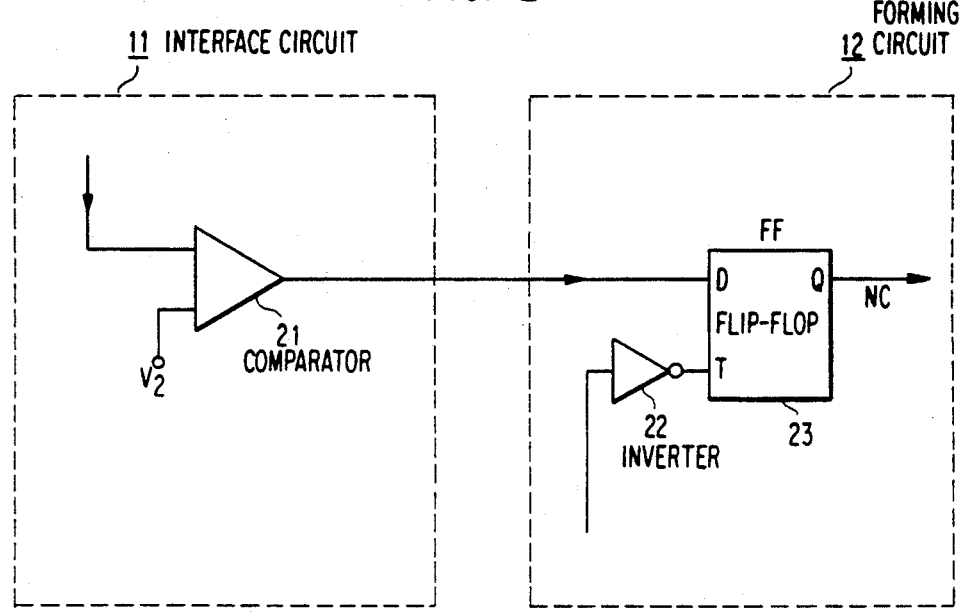
FIG. 2 is a circuit diagram illustrating one embodiment of faulty pulse detecting means of the contact detecting device of the present invention.
Figure 3A:
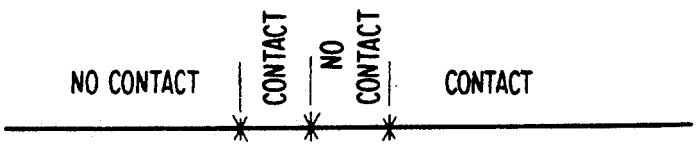
FIGS. 3A-3G are operation diagrams and waveforms of the embodiment of the present invention illustrated in FIGS. 1 and 2.
Figure 3B:
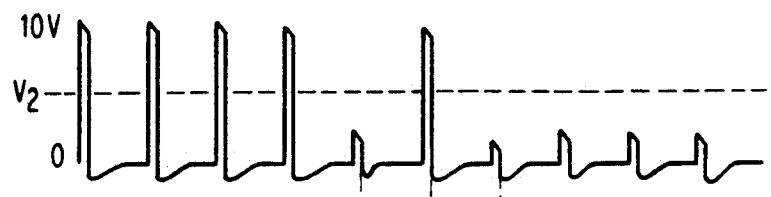
Figure 3C:
Figure 3D:
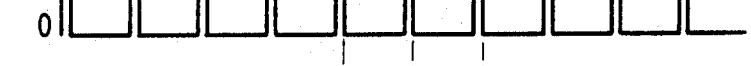
Figure 3E:
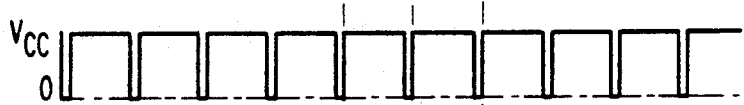
Figure 3F:

FIG. 2 illustrates one embodiment of the faulty pulse detecting circuit 10. An interface 11 is used for converting an analog signal applied to the gap into a binary signal. A signal forming circuit 12 is used to determine if contact has been made at the gap, in accordance with the gap signal digitized by the interface 11, and to form a binary signal to be transmitted to the NC unit 41. In the interface 11, a comparator 21 compares the gap voltage, as seen in FIG. 3B, with the reference voltage $V_2$ and outputs a binary signal having "high" magnitude Vcc or "low" magnitude 0, as seen in FIG. 3C, denoting whether or not the gap voltage exceeds the threshold voltage $V_2$. In the signal forming circuit 12, an inverter 22 is used to invert a reference oscillation signal 51A, having a magnitude Vcc, as seen in FIG. 3D. Signal 51A also controls the on/off switching of transistor 50 in FIG. 1. The inverted signal is seen in FIG. 3E. A flip-flop 23 forms signals identifying contact and non-contact at the gap, in synchronization with the detection pulse, as seen in FIG. 3F. Specifically, the output of flip-flop 23 at terminal Q is generated in accordance with the signal inverted by the inverter 22 (input to terminal T) and the signal binarized by the interface 11 (input to terminal D). The flip-flop 23 continues outputting the state of input D until the instant when the next leading edge of input T occurs, as seen in FIGS. 3E and 3F.

Operation of the embodiment will now be described with reference to FIGS. 1, 2 and 3A–3G. FIGS. 3A–3G illustrate operating conditions and waveforms relevant to the contact position determining operation in a wirecut EDM employing the contact detecting device shown in FIGS. 1 and 2.

Initially, when a command requesting conduct of the contact position determining operation is transmitted to the NC control unit 41, the switch 55 is closed. As a result, a low-duty, asymmetrical bipolar pulse voltage is applied to the gap by the bipolar pulse voltage generating circuit 5A. The asymmetrical bipolar pulse voltage is generated on the secondary side of the pulse transformer 53 by applying a single-polar pulse to a combination of the primary side of the pulse transformer 53 and the diode 52. The pulse leading edge side, i.e., the side on which voltage is not cut by the diode 52, has a high peak value. Approaching speeds and approaching directions for the wire 1 and the work 2 are determined, and movement proceeds.

Figure 3G:
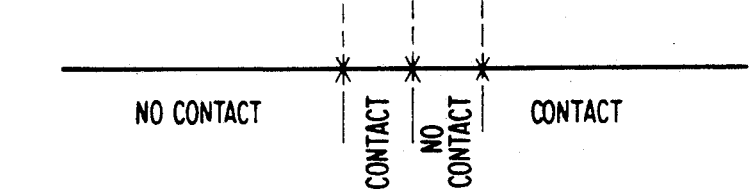

At this time, the faulty pulse detecting circuit 10 periodically compares the gap voltage, i.e., the high-peak voltage of the asymmetrical bipolar pulse voltage (FIG. 3B), with reference voltage $V_2$ in synchronization with the leading edge of the single-polarity pulse applied to the primary side of the pulse transformer 53. If the actual contact condition of the wire and the work is represented by FIG. 3A, then a judgment of the contact detecting device as seen in FIG. 3G is desired, showing a relatively minor delay in identifying the contact. To this end, if the high-peak voltage of the asymmetrical bipolar pulse voltage is equal to or less than $V_2$, as seen in FIG. 3B, the comparator fails to produce a pulse in response to the bipolar pulse voltage as seen in FIG. 3C. In the absence of this pulse a signal indicating a contact is sent to the NC unit 41 for the period of the detection pulse cycle only (FIG. 3F). The approaching of the wire 1 and the work 2 is stopped and the contact position determining operation is complete.

The contact is detected in complete synchronization with the asymmetrical bipolar pulse voltage, and the delay of detection is made less than the period of the detection pulse. Since the determination of the contact is only made at the high peak of the detection pulse applied to the gap, the pulse voltage no-application time $T_{off}$ and the voltage at the low peak of the detection pulse are not a factor. This allows the detection pulse supplied to the gap to have a significantly lower duty. In other words, pulse width $T_{on}$ can be reduced to a value of several $\mu s$ or less, which is small as compared to the pulse cycle of up to ten ms or more. Further, the low-peak voltage of the detection pulse can be significantly low as compared to the high-peak voltage. Since the duty of the detection pulse supplied to the gap can be significantly lowered, only a small current flows due to electrolysis when the wire 1 and work 2 are adjacent to or in contact with each other. Accordingly, little if any damage to the wire 1 and work 2 will occur and the accuracy of the device is not degraded by repeated positioning.

The cycle of the detection pulse is another factor having great influence on the generation of damage and detection accuracy. It is assumed that as the pulse cycle becomes longer, the damage is less and the detection delay increases. When a typical table feed rate is used for general positioning, if the pulse cycle is less than about 10 msec, an error will rarely result from the delay and any subtle change in the gap may be detected. In addition, since the low peak voltage of the detection pulse can be held at a low level, the high-peak voltage can be increased to a relatively high level and the large voltage difference at the gap between an open gap and contact allows contact to be detected with higher sensitivity.

It will be appreciated that a negative peak voltage of the asymmetrical bipolar pulse may be applied to the wire 1 instead of a positive peak voltage as in the foregoing embodiment.

Figure 4:
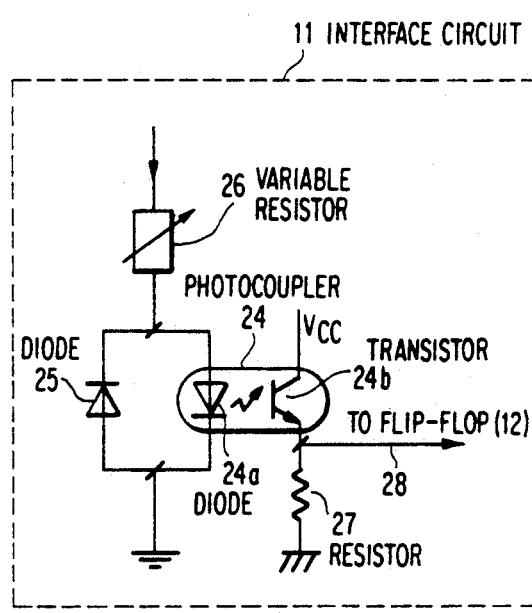
FIG. 4 is a circuit diagram illustrating another embodiment of an interface of the faulty pulse detecting means of the present invention.

As another embodiment of the interface 11 shown in FIG. 2, a photocoupler illustrated in FIG. 4 may be utilized. In FIG. 4, a photocoupler 24 includes a transistor $24b$ that is connected to a voltage $V_{cc}$ and is on/off controlled in accordance with the value of the current flowing in a diode 24b. A diode 25 serves to protect the photocoupler 24 from the application of excessive reverse voltage. A variable resistor 26 is used for controlling the current flowing in the diode 24a of the photocoupler 24 and determining a gap voltage value for changing the on/off state of the transistor 24b in the photocoupler 24. A resistor 27 connects the photocoupler transistor 24b to ground.

In operation, if the transistor 24b of the photocoupler 24 is switched ON when the value of the current flowing in the diode 24a of the photocoupler 24 is greater than $I_2$, and the transistor is switched OFF when the value is smaller than $I_2$, the resistance value of the variable resistor 26 is $V_2/I_2$. Then, a "high" signal appears at the output line 28 when the gap voltage is greater than $V_2$, a "low" signal appears at 28 when the value is smaller than $V_2$, and the relationship between the gap voltage and the signal transmitted to the signal forming circuit 12 is the same as that shown in FIGS. 2 and 3.

Figure 5:
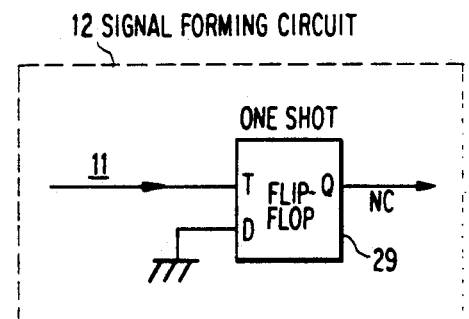
FIG. 5 is a circuit diagram illustrating another embodiment of a signal forming portion of the faulty pulse detecting means of the present invention.

As another embodiment of the signal forming circuit 12 shown in FIG. 2, a one-shot circuit 29 illustrated in FIG. 5 also may be utilized. In the one-shot circuit shown in FIG. 5, output Q is switched high when a leading edge signal enters input T and is held high for a predetermined period of time ($T_H$). When $T_H$ has elapsed, output Q is switched low and held low until the leading edge signal enters input T again. If the leading edge signal enters input T when output Q is high, output Q is held high for $T_H$ from that instant. Therefore, contact at the gap can be detected in synchronization with the cycle of the detection pulse without the input of a reference oscillation signal 3. Since the signal holding time $T_H$ may be set to any value, a $T_H$ value slightly longer than the detection pulse cycle will provide substantially equivalent operation to that shown in FIGS. 2 and 3.

If a contact judgment is not desired in response to subtle changes at the gap, resulting from, for example, minor vibration of the wire 1 or conductive materials attaching to the wire 1, the addition of another one-shot circuit to a subsequent stage of the faulty pulse detecting circuit 10 will retain the signal sent to the NC unit 41 at the time of a state change for a period several times longer than the period of the detection pulse applied to the gap. As a result, the speed of contact judgment may be lowered without varying the duty, frequency, peak voltage, etc. of the detection pulse, and contact/non-contact judgment may be avoided for subtle state changes in the gap. Additional one shot circuits may be placed in series where vibration is excessive.

FIGS. 6A–6F illustrate timing diagrams and operation charts for a circuit having a one-shot circuit at a subsequent stage of the faulty pulse detecting circuit 10, with a signal holding time $T_H$ twice as long as the period $T_1$ of the asymmetrical alternating-current pulse voltage. In this case, FIG. 6A identifies the actual contact condition of the wire and the work while FIG. 6B illustrates the gap voltage, FIG. 6C the comparator output from circuit 11 and FIG. 6D the output from circuit 12. When a one shot is applied between the circuit 10 and the NC unit 41, the signal denoting a contact is not transmitted to the NC unit 41 unless contact is maintained for a continuous period of time twice the period of the detection pulse, as seen in FIG. 6E. The contact judgment timing is seen in FIG. 6F.

It will be recognized that the present invention may be used as a contact detector in an engraving EDM in addition to the wirecut EDM as described previously. Moreover, the invention may be applied to any other device requiring contact detection, so long as contact is detectable by electrical means.

It will be apparent that the present invention, as described above, can achieve a contact detecting device which will minimize damage to the contacting elements by applying a low-duty, asymmetrical bipolar pulse voltage to the gap between the elements, detecting the high-peak level of an asymmetrical bipolar pulse voltage by means of faulty pulse detecting means, and judging from the detection whether or not the elements are making contact with each other. The invention also lowers significantly the reduction of contact positioning accuracy by eliminating the occurrence of detection delay.

While the present invention has been described using several preferred embodiments, it is not intended to be limited thereto and its full scope is defined by the appended claims.

What is claimed is:

1. A contact device for detecting a relative position between first and second elements by repeatedly applying a detection voltage to a gap between said first element and said second element and detecting contact of said first and second elements in accordance with a change of said detection voltage, comprising:
   means for generating a low-duty, asymmetrical bipolar pulse voltage having positive component and a negative component, one of said components of said pulse voltage having a duration which is substantially shorter than the other component of said pulse voltage;
   means for applying said low-duty pulse voltage to said gap; and
   means for detecting a change in said low-duty pulse-voltage across said gap.

2. The contact detecting device of claim 1, wherein said detecting means comprises:
   means for comparing said low-duty pulse voltage to a reference voltage and for generating a comparison output signal; and
   control means synchronized with said low-duty pulse voltage for generating a control signal in response to said comparison output signal for identifying a contact.

3. The contact detecting device of claim 2, wherein said means for comparing comprises a voltage source operative to provide said reference voltage and a comparator circuit operative to output said comparison output signal when a peak of said low-duty pulse voltage exceeds said reference voltage.

4. The contact detecting device of claim 3, wherein said comparator circuit comprises a photocoupler.

5. The contact detecting device of claim 2, wherein said control means comprises delay means responsive to said change in said low-duty pulse for delaying the identification of a contact for a predetermined period of time.

6. The contact detecting device of claim 5, wherein said predetermined time comprises a duration longer than the period of said low-duty pulse voltage.

7. The contact detecting device of claim 2 further comprising means for lowering the speed of identifying a contact by retaining said control signal for a predetermined period of time.

8. The contact detecting device of claim 1, wherein said means for generating comprises a reference oscillation signal source operative to provide timing for said pulse voltage and said means for detecting further comprises inverter means responsive to said reference oscillation signal source for generating a gate signal operative to provide timing for detecting said gap voltage change.

9. The contact detecting device of claim 8 further comprising:
   comparator means responsive to said pulse voltage and a reference voltage for generating a comparator output signal; and
   means responsive to said comparator output signal and said gate signal for judging the coincidence of said signals and generating a contact judgment signal.

10. A device for detecting the relative position of between first and second conductive elements, comprising:
   means for providing an asymmetrical bipolar pulse voltage, having a predetermined cycle, to a gap between said elements, said pulse voltage having a positive component and a negative component, one of said components of said pulse voltage having a duration that is substantially shorter than the other component of said pulse voltage;
   contact judging means for detecting a level of said asymmetrical bipolar pulse voltage applied to said gap in synchronization with said cycle and for judging whether or not said elements are making contact with each other from the characteristics of said peak level.

11. A detecting device as set forth in claim 10, wherein said contact judging means comprises comparator means for comparing the peak of said pulse voltage with a reference and for generating a comparison output signal in synchronization with said cycle.

12. The detecting device of claim 11, wherein said comparator means comprises a photocoupler circuit and a source of reference voltage.

13. The detecting device as set forth in claim 10, wherein said contact judging means comprises gate means operative at said cycle, for providing said comparison output signal to identify whether contact is being made.

14. The detecting device as set forth in claim 10, wherein said contact judgment means further comprises means operative to receive said comparison output signal and to delay said signal for a period greater than said cycle.

15. A detecting device as set forth in claim 10, further comprising means responsive to the judgment of said contact judging means for delaying an indication of said contact judgment for a period greater than said cycle.

16. The detecting device as set forth in claim 15, wherein said delaying means comprises one shot means.

17. The detecting device as set forth in claim 16, wherein said one shot means comprises plural one-shot circuits connected in series.

18. A method of detecting the relative position of a first and second elements, comprising:
   applying a first signal voltage to a gap between said elements, said first signal voltage comprising a low-duty, asymmetrical bipolar pulse voltage having a predetermined period;
   detecting said first signal voltage at said gap;
   gating said detected first signal voltage in response to a second signal synchronized with said first signal to generate a contact identifying signal.

19. The method of claim 18, wherein said detecting step comprises comparing said first signal voltage at said gap with a reference.

20. The method of claim 19 further comprising delaying said contact identifying signal for a time longer than said period.

21. A contact detecting device for repeatedly applying a detection voltage to a gap between a first element and a second element and detecting contact of said first and second elements in accordance with a change in said detection voltage, comprising:
   means for generating a low-duty asymmetrical bipolar pulse voltage having a positive component and a negative component, one of said components having a duration which is substantially shorter than the other of said components;
   means for applying said pulse voltage to said gap; and
   means for detecting a change in said pulse voltage across said gap, said detecting means comprising a voltage source outputting a reference voltage, a comparator circuit connected to said voltage source and said means for generating said pulse voltage so as to generate a comparison output signal when a peak of said pulse voltage exceeds said reference voltage and control means synchronized with said pulse voltage for generating a control signal in response to said comparison output signal for identifying a contacting state between said first and second elements.

22. A contact detecting device as claimed in claim 21, wherein said comparator circuit comprises a photocoupler.

* * * * *